United States Patent
Jang

(10) Patent No.: US 12,455,607 B2
(45) Date of Patent: Oct. 28, 2025

(54) STORAGE DEVICE FOR EXECUTING BACKGROUND OPERATION BASED ON POWER STATE AND OPERATING METHOD THEREOF

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 98 days.

(21) Appl. No.: 18/172,477

(22) Filed: Feb. 22, 2023

(65) Prior Publication Data

US 2024/0176407 A1  May 30, 2024

(30) Foreign Application Priority Data

Nov. 25, 2022  (KR) .......................... 10-2022-0160003

(51) Int. Cl.
  *G06F 1/00*  (2006.01)
  *G06F 1/3225*  (2019.01)
  *G06F 1/3296*  (2019.01)

(52) U.S. Cl.
  CPC .......... *G06F 1/3225* (2013.01); *G06F 1/3296* (2013.01)

(58) Field of Classification Search
  CPC ..................................................... G06F 1/3225
  See application file for complete search history.

(56) References Cited

U.S. PATENT DOCUMENTS

| | | | |
|---|---|---|---|
| 10,379,589 B2 * | 8/2019 | Ferguson | G06F 1/3296 |
| 11,353,946 B2 | 6/2022 | Shen et al. | |
| 2009/0156270 A1 * | 6/2009 | Thompson | H04W 52/028 455/574 |
| 2018/0321972 A1 * | 11/2018 | Lin | G06F 9/4887 |
| 2020/0409441 A1 | 12/2020 | Hatch et al. | |
| 2021/0211877 A1 * | 7/2021 | Lagnado | H04L 63/105 |
| 2021/0223846 A1 | 7/2021 | Shen et al. | |
| 2021/0224187 A1 * | 7/2021 | Um | G06F 12/0882 |
| 2022/0179585 A1 * | 6/2022 | Muthiah | G06F 3/0673 |
| 2023/0229218 A1 * | 7/2023 | Choi | G06F 1/266 713/310 |

FOREIGN PATENT DOCUMENTS

KR  10-2020-0091679 A  7/2020

\* cited by examiner

*Primary Examiner* — Mohammed H Rehman

(57) ABSTRACT

A storage device may enter a plurality of intermediate power states sequentially while entering from a first power state to a second power state. The storage device may check background flag information while entering each of the plurality of intermediate power states, and execute a target background operation, executable in a first intermediate power state, based on the background flag information.

18 Claims, 14 Drawing Sheets

BKOP : migration (1st type -> 2nd type)

BKOP : flush data stored in buffer

STORAGE DEVICE FOR EXECUTING BACKGROUND OPERATION BASED ON POWER STATE AND OPERATING METHOD THEREOF

CROSS-REFERENCES TO RELATED APPLICATION

The present application claims priority under 35 U.S.C. § 119(a) to Korean patent application number 10-2022-0160003 filed in the Korean Intellectual Property Office on Nov. 25, 2022, which is incorporated herein by reference in its entirety.

BACKGROUND

1. Technical Field

Various embodiments generally relate to a storage device for executing background operations based on power state and methods for operating the storage device.

2. Related Art

A storage device is a device that stores data according to a request from an external device such as a computer, a mobile terminal like a smartphone and a tablet, or various other electronic devices.

The storage device may include a controller for controlling a memory (e.g., a volatile memory or a nonvolatile memory) included in the storage device. The controller may receive a command from the external device, and may execute or control an operation for reading, writing or erasing data with respect to the memory, consistent with the received command.

Meanwhile, the storage device may enter a low power state when receiving a command from the external device requesting entry into the low power state or when a preset low power state entrance condition is satisfied. In the low power state, the storage device may have limited executable operations or limited performance.

SUMMARY

Various embodiments are directed to a storage device capable of executing background operations efficiently before entering a low power state, and methods for operating the storage device.

Also, various embodiments are directed to a storage device capable of preventing malfunction due to sudden power off or clock down, and methods for operating the storage device.

In an embodiment, a storage device may include: i) a memory including a plurality of memory blocks; and ii) a controller configured to enter a plurality of intermediate power states sequentially while transitioning from a first power state to a second power state, check background flag information indicating background operations executable in each of the plurality of intermediate power states when entering each of the plurality of intermediate power states, and execute a target background operation, executable in a first intermediate power state, among the executable background operations based on the background flag information, after entering the first intermediate power state and before entering a second intermediate power state.

In an embodiment, a method for operating a storage device may include: i) entering a first intermediate power state among a plurality of intermediate power states that are entered sequentially while transitioning from a first power state to a second power state; ii) checking background flag information indicating background operations executable among a plurality of background operations; iii) executing a target background operation executable in the first intermediate power state based on the background flag information; and iv) determining whether to enter a second intermediate power state.

In an embodiment, a controller may include: i) a memory interface capable of communicating with a memory including a plurality of memory blocks; and ii) a control circuit configured to enter a plurality of intermediate power states sequentially while transitioning from a normal state consuming a first power to a low power state consuming a second power, which is less than the first power, and execute, while entering each of the plurality of intermediate power states, an executable background operation from among a plurality of background operations based on background flag information indicating executable background operations.

According to embodiments of the disclosed technology, it is possible to execute background operations efficiently before entering a low power state, and prevent malfunction due to sudden power off or clock down.

DETAIL DESCRIPTION OF THE EXEMPLARY EMBODIMENTS

Figure 1:
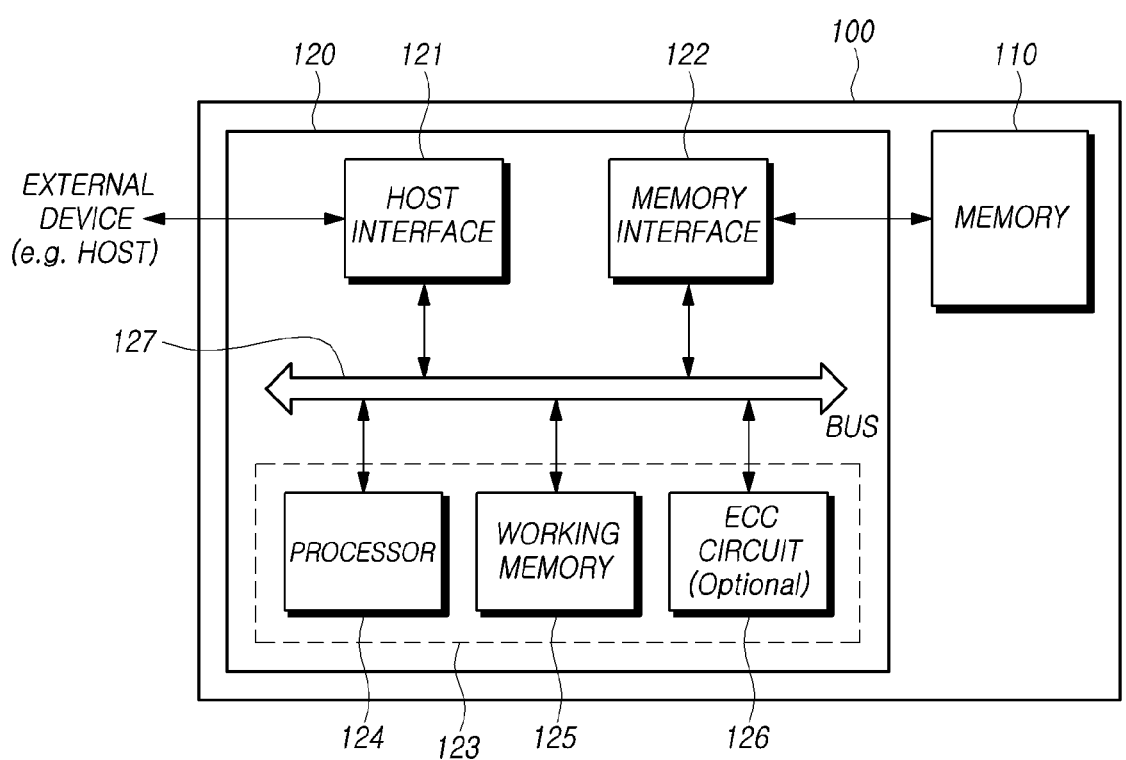
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined. Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
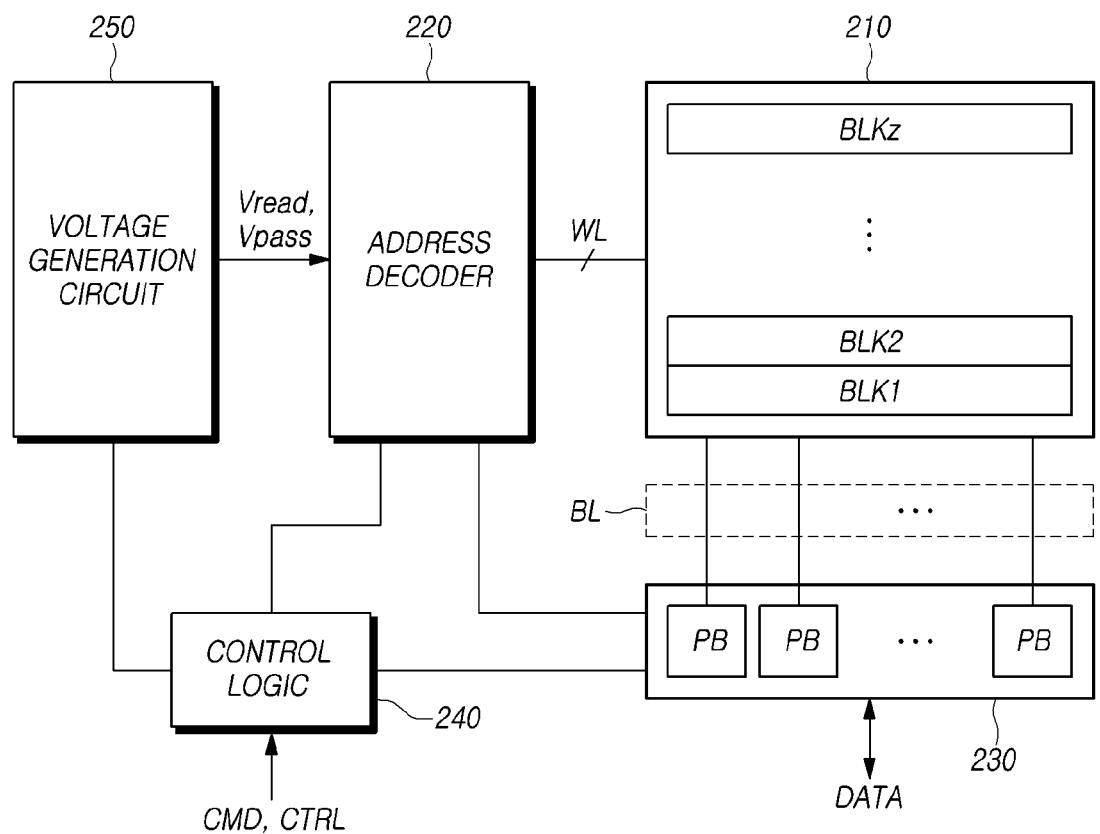
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
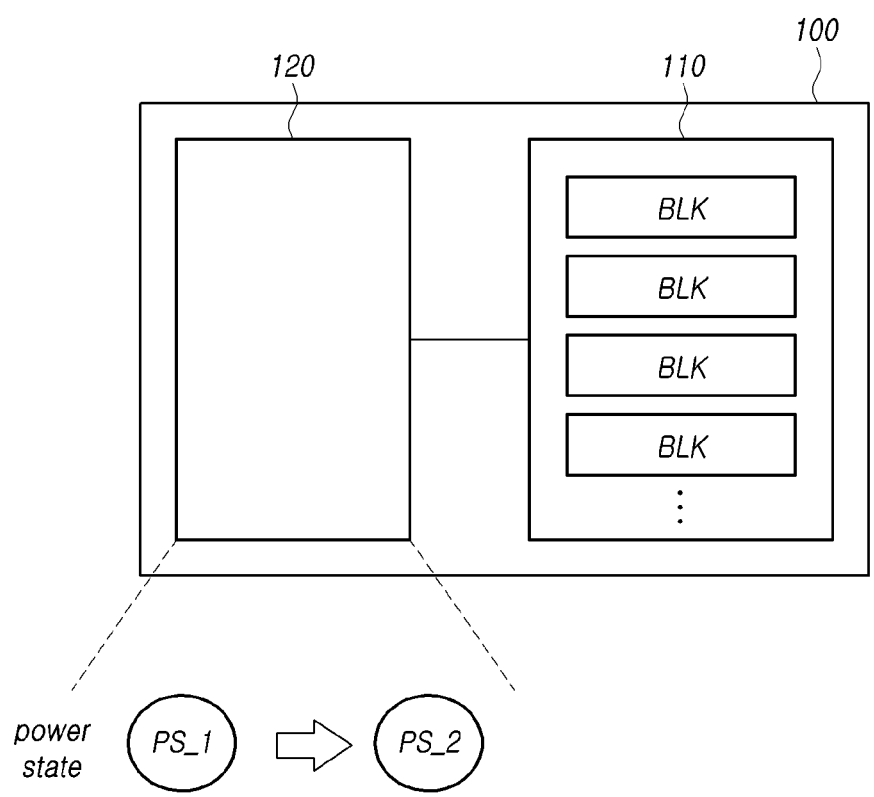
FIG. 3 is a diagram illustrating a schematic structure of a storage device according to an embodiment of the disclosure.

FIG. 3 is a diagram illustrating a schematic structure of a storage device according to an embodiment of the disclosure.

Referring to FIG. 3, a storage device 100 may include a memory 110 and a controller 120.

The memory 110 may include a plurality of memory blocks BLK.

The controller 120 may access the plurality of memory blocks BLK included in the memory 110.

For example, the controller 120 may execute a read, write, or erase operation on the plurality of memory blocks BLK. As another example, the controller 120 may execute a background operation (e.g. garbage collection, read reclaim) on the plurality of memory blocks BLK.

The controller 120 may use power to access the plurality of memory blocks BLK. The power available to the controller 120 may be determined based on the power state of the controller 120. That is, power available to the controller 120 may vary depending on the power state that the controller 120 enters.

In embodiments of the present disclosure, the controller 120 may enter a second power state PS_2 from a first power state PS_1. The value of power used by the second power state PS_2 and the first power state PS_1 may be different from each other. For example, the second power state PS_2 may use less power than the first power state PS_1. In another example, the second power state PS_2 may use more power than the first power state PS_1.

Hereinafter, embodiments will be described in which the second power state PS_2 uses less power than the first power state PS_1. In other embodiments, however, the second power state PS_2 may use more power than the first power state PS_1.

For example, the controller 120 may enter the second power state PS_2 from the first power state PS_1 when a command requesting a change to the power state (e.g., H8 command) is received from outside of the storage device 100 (e.g., HOST) or when a preset power state change condition is satisfied.

Hereinafter, an operation of the controller 120 entering the second power state PS_2 from the first power state PS_1 will be described in detail in FIG. 4.

Figure 4:
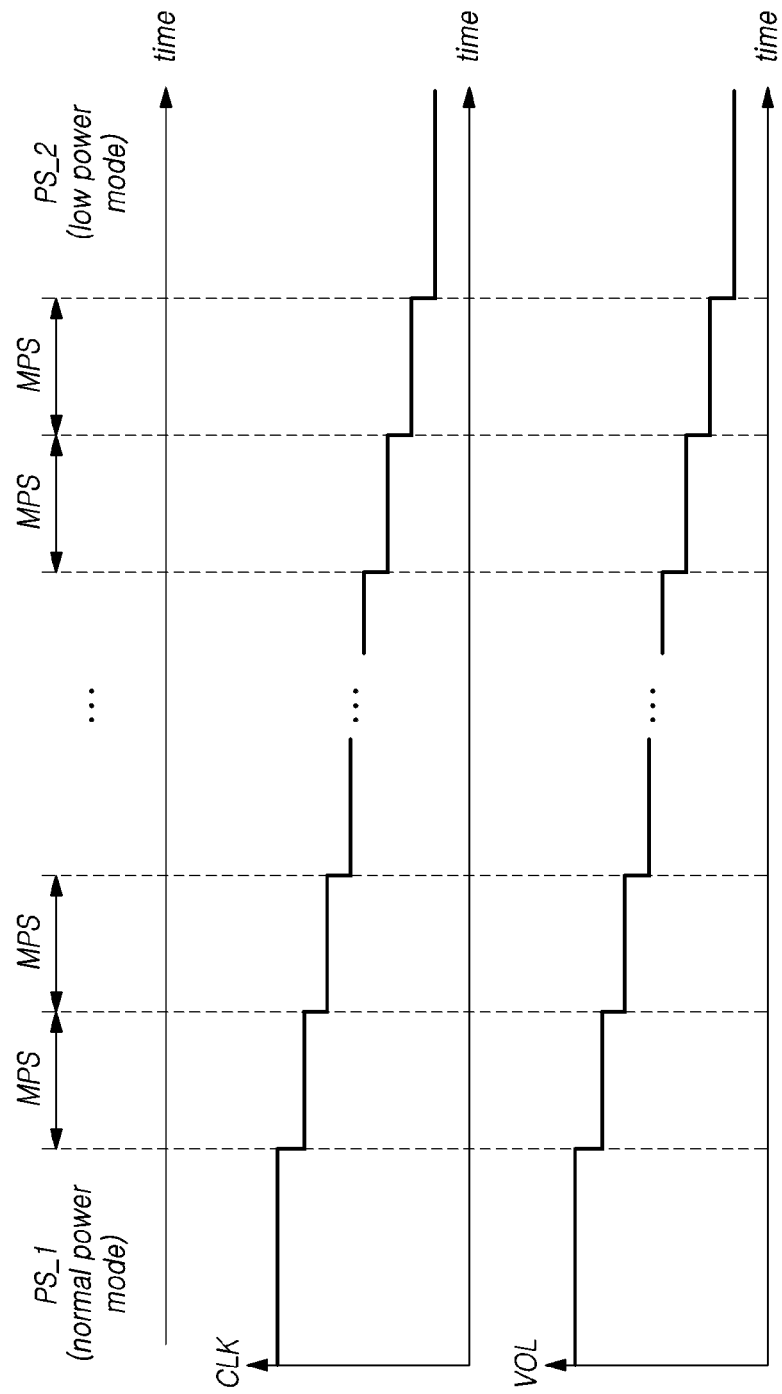
FIG. 4 is a diagram illustrating an example in which a storage device enters a second power state from a first power state to according to an embodiment of the disclosure.

FIG. 4 is a diagram illustrating an example in which a storage device enters a second power state from a first power state to according to an embodiment of the disclosure.

Referring to FIG. 4, a controller 120 of the storage device 100 may enter a second power state PS_2 from a first power state PS_1.

For example, the first power state PS_1 may be a normal state in which maximum power is available. At this time, the controller 120 may execute an executable operation without being limited in power usage.

For example, the second power state PS_2 may be a low power state in which power usage is limited. In this case, the controller 120 may use power below a set threshold power, and thus, executable operations may be limited. The second power state PS_2 may be an idle state or a hibernation state defined in an UFS specification.

For example, the controller 120 may enter an idle state when not receiving a command requesting a specific operation (e.g., a read, write or erase operation) from the outside for a preset threshold time period. As another example, the controller 120 may enter a hibernating state when receiving a command from the outside to enter the low power state. In this case, the controller 120 may enter the second power state PS_2.

The controller 120 of the storage device 100 may execute operations required to enter the second power state PS_2 from the first power state PS_1. For example, the controller 120 may execute an operation disabling an operating clock, an operation stopping a phase locked loop circuit, a power domain isolation operation, an operation disabling power switch, or an operation setting low dropout (LDO) to eco mode. etc.

In embodiments of the present disclosure, the controller 120 may sequentially enter a plurality of intermediate power states MPS while transitioning from the first power state PS_1 to the second power state PS_2. That is, instead of directly entering the second power state PS_2 from the first power state PS_1, the controller 120 may enter the second power state PS_2 after passing through the plurality of intermediate power states MPS from the first power state PS_1.

The controller 120 may decrease an operating clock CLK and an operating voltage VOL when entering each of the plurality of intermediate power states MPS. That is, the controller 120 may stepwise decrease the operating clock CLK and the operating voltage VOL while sequentially entering the plurality of intermediate power states MPS.

As a result, the controller 120 may prevent a malfunction that may occur due to an abrupt change in the operating clock and operating voltage when entering the second power state PS_2 from the first power state PS_1.

Figure 5:
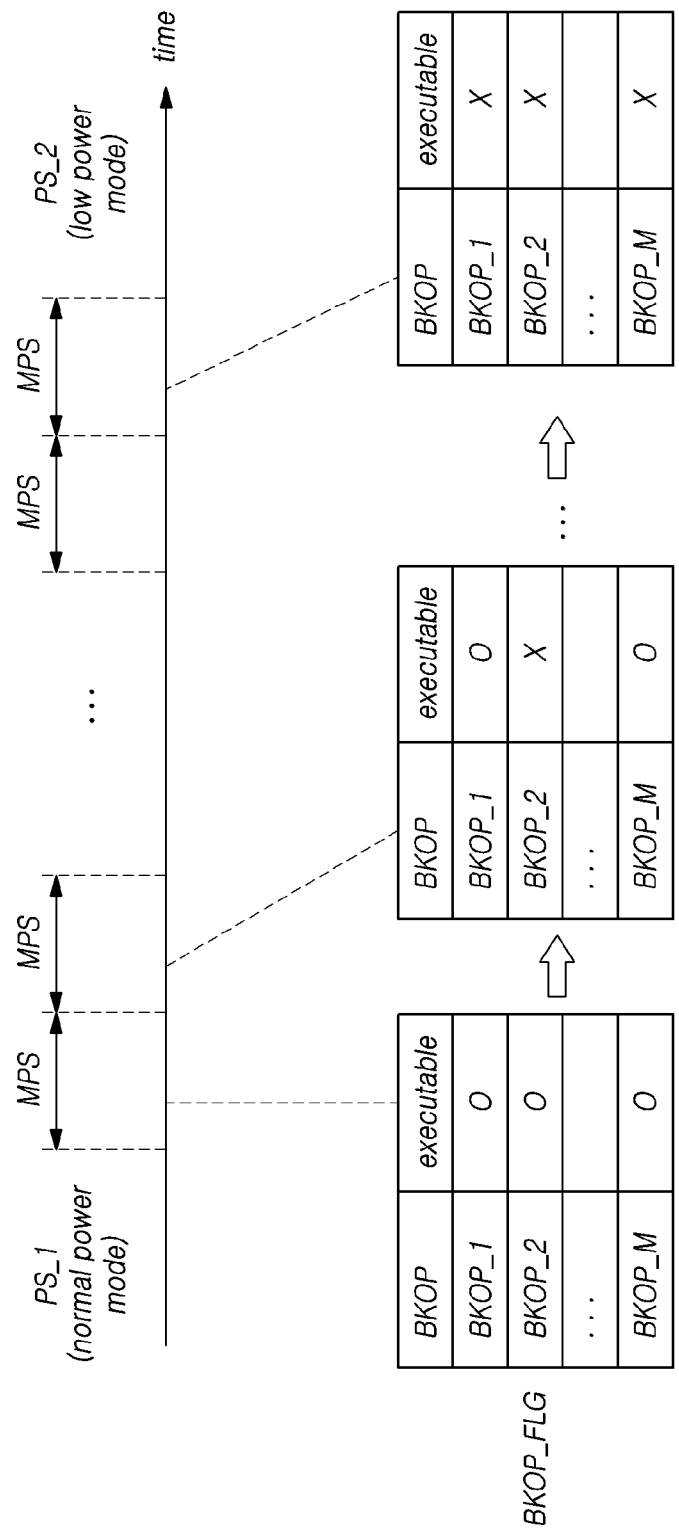
FIG. 5 is a diagram illustrating an example in which a storage device determines background flag information while entering each of a plurality of intermediate power states according to an embodiment of the disclosure.

FIG. 5 is a diagram illustrating an example in which a storage device determines background flag information while entering each of a plurality of intermediate power states according to an embodiment of the disclosure.

Referring to FIG. 5, a controller 120 of a storage device 100 may check background flag information BKOP_FLG while entering each of a plurality of intermediate power states MPS.

The background flag information BKOP_FLG for a specific intermediate power state may indicate background operations BKOP executable by the controller 120 while in a specific intermediate power state.

For example, the background operations BKOP may include at least one of i) a garbage collection on the plurality of memory blocks BLK included in the memory 110, ii) flushing data stored in a buffer (not shown) to the memory 110, iii) migrating data stored in a first type memory block, among the plurality of memory blocks BLK, to a second type memory block, and iv) erasing one or more of the plurality of memory blocks BLK.

The garbage collection operation is an operation that erases victim memory blocks, which are some of the plurality of memory blocks BLK, after migrating valid data stored in the victim memory blocks to other memory blocks.

Flushing data stored in the buffer (not shown) to the memory 110 is an operation of writing data stored in the buffer to the plurality of memory blocks BLK included in the memory 110 and then deleting the written data from the buffer.

The buffer may be, for example, a partial area on the working memory 125 inside the controller 120. The data stored in the buffer may be, for example, data requested to be written from the outside of the storage device 100 or map data indicating a mapping relationship between a logical address and a physical address.

Migrating data stored in the first type memory block, among the plurality of memory blocks BLK, to the second type memory block is an operation of writing the data stored in the first type memory block to the second type memory block and then deleting or invalidating the data from the first type memory block.

The second type memory block may have a larger storage capacity than the first type memory block. For example, the first type memory block may be an SLC memory block and the second type memory block may be a MLC memory block, a TLC memory block, or a QLC memory block.

Erasing one or more of the plurality of memory blocks BLK is an operation of erasing a memory block in which only invalid data is stored and changing the memory block to a state in which new data can be written. After erasing one or more of the plurality of memory blocks BLK, the erased memory blocks may be in a suspended state.

When the controller 120 enters a specific intermediate power state, only some of the background operations BKOP may be executable. For example, the controller 120 may not be able to use sufficient power to execute a specific background operation, or may not be able to execute another operation because the specific background operation is completed.

Therefore, the controller 120 may check the background flag information BKOP_FLG when the controller 120 enters each of the plurality of intermediate power states MPS, and execute an executable background operation in each intermediate power state based on the background flag information.

In this way, the controller 120 may maximize the number of background operations to be executed for each of the plurality of intermediate power states MPS, thereby efficiently completing as many as possible the background operations before entering the second power state PS_2.

In FIG. 5, when the controller 120 is capable of executing an M (where M is a natural number greater than 2) number of background operations (BKOP_1, BKOP_2, . . . , BKOP_M) before entering the second power state PS_2 from the first power state PS_1, the background flag information BKOP_FLG may indicate which background operation from among the M number of background operations BKOP_1, BKOP_2, . . . , BKOP_M is executable in the corresponding intermediate power state.

In FIG. 5, in an intermediate power state immediately after the first power state PS_1, the background flag information BKOP_FLG may indicate that all of the background operations BKOP_1, BKOP_2, . . . , and BKOP_M are executable ("O" in FIG. 5) in the corresponding intermediate power state.

In the next intermediate power state, the background flag information BKOP_FLG may indicate that the background operations BKOP_1 and BKOP_M are executable and the background operations BKOP_2 are not executable ("X" in FIG. 5) in the corresponding intermediate power state.

And in the intermediate power state immediately before the second power state PS_2, the background flag information BKOP_FLG may indicate that all of the background operations BKOP_1, BKOP_2, . . . , and BKOP_M are not executable in the corresponding intermediate power state.

The background flag information BKOP_FLG may be previously set before entering the second power state PS_2 from the first power state PS_1. The background flag information BKOP_FLG may be preset for each intermediate power state MPS or may be dynamically changed according to an operation performed by the controller 120 in the previous intermediate power state.

Figure 6:
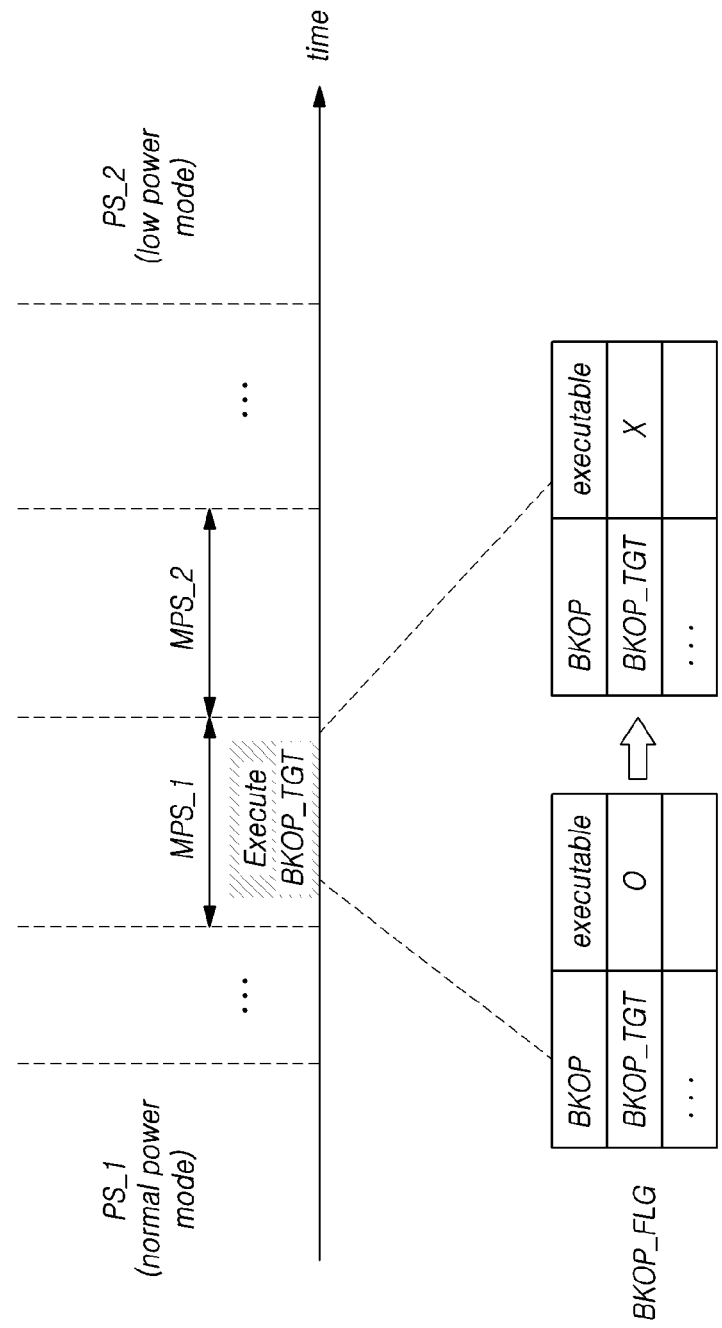
FIG. 6 is a diagram illustrating an example in which a storage device executes a target background operation in a first intermediate power state according to an embodiment of the disclosure.

FIG. 6 is a diagram illustrating an example in which a storage device executes a target background operation in a first intermediate power state according to an embodiment of the disclosure.

Referring to FIG. 6, a controller 120 of a storage device 100 may enter a first intermediate power state MPS_1 among a plurality of intermediate power states MPS.

Thereafter, the controller 120 may confirm that a target background operation BKOP_TGT is executable by checking the background flag information BKOP_FLG before entering the second intermediate power state MPS_2.

Therefore, the controller 120 may execute the target background operation BKOP_TGT in the first intermediate power state MPS_1 before entering the second intermediate power state MPS_2.

Meanwhile, when execution of the target background operation BKOP_TGT is completed in the first intermediate power state MPS_1, the controller 120 may set in the background flag information BKOP_FLG that the target background operation BKOP_TGT is not executable.

Figure 7:
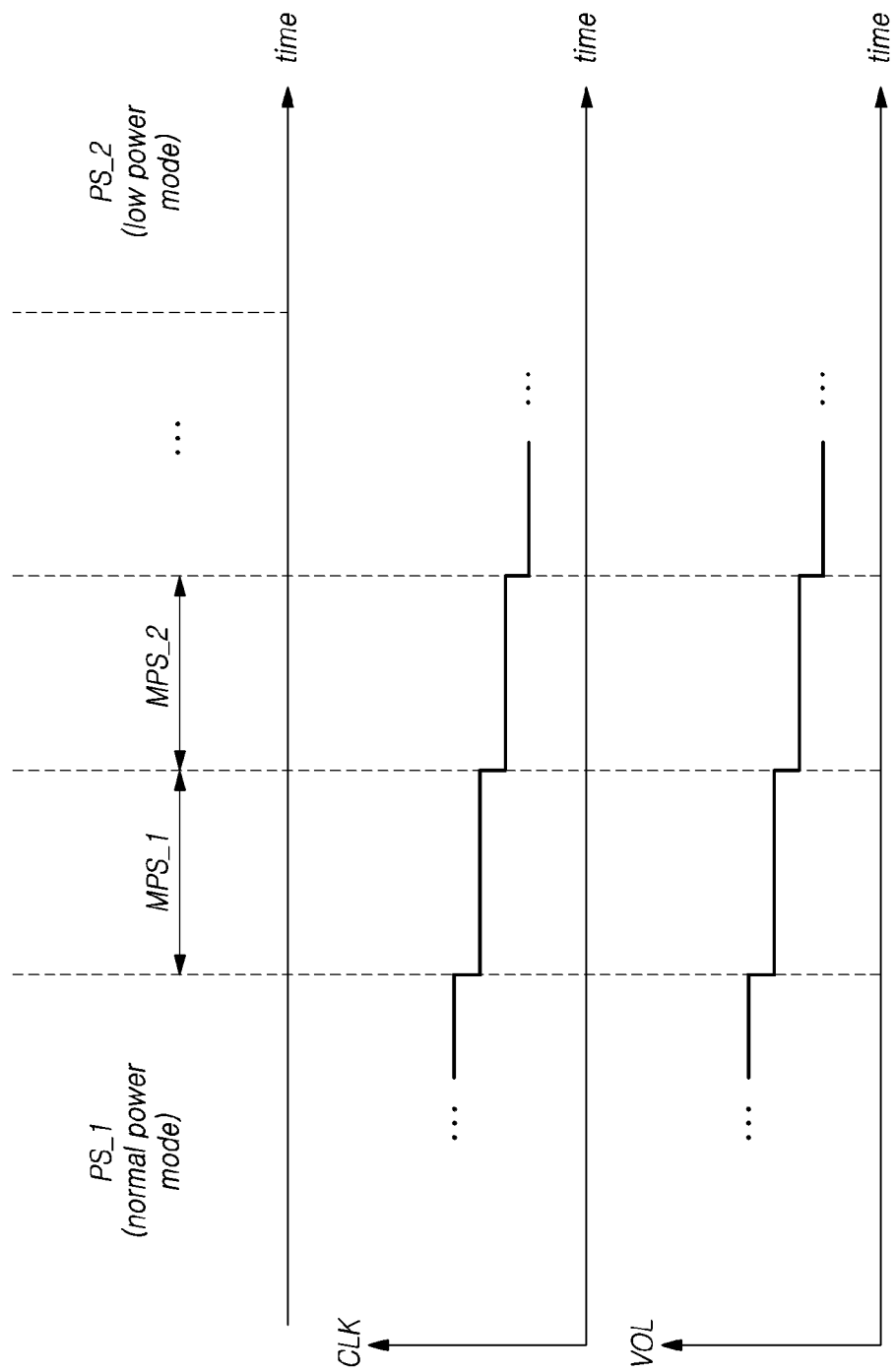
FIG. 7 is a diagram illustrating another example in which a storage device enters a second power state from a first power state according to an embodiment of the disclosure.

FIG. 7 is a diagram illustrating another example in which a storage device enters a second power state from a first power state according to an embodiment of the disclosure.

Referring to FIG. 7, when entering from a first intermediate power state MPS_1 to a second intermediate power state MPS_2, a controller 120 of a storage device 100 may decrease an operating clock CLK and an operating voltage VOL.

In FIG. 7, the operating clock of the second intermediate power state MPS_2 is less than the operating clock of a first intermediate power state MPS_1. Also, the operating voltage of the second intermediate power state MPS_2 is less than the operating voltage of the first intermediate power state MPS_1.

Accordingly, background operations executable by the controller 120 in the second intermediate power state MPS_2 may be limited compared to the number of executable background operations in the first intermediate power state MPS_1.

Although not illustrated in FIG. 7, in other embodiments, the controller 120 may increase the operating clock CLK and the operating voltage VOL when entering the second intermediate power state MPS_2 from the first intermediate power state MPS_1. In such instances, background operations executable by the controller 120 in the second intermediate power state MPS_2 may not be limited compared to the executable background operation in the first intermediate power state MPS_1. However, the controller 120 may pre-execute a background operation to be executed in the first intermediate power state MPS_1 in order for the background operation to be executed in the second intermediate power state MPS_2.

Figure 8:
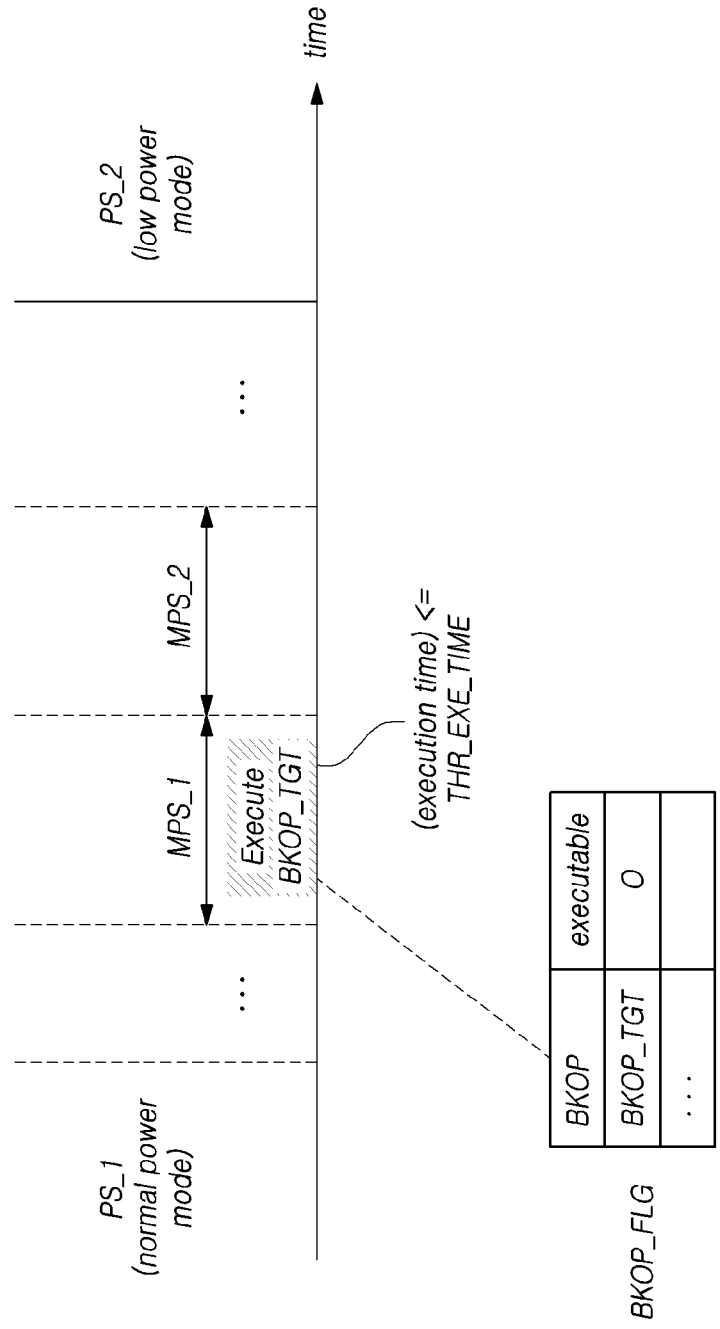
FIG. 8 is a diagram illustrating another example in which a storage device executes a target background operation in a first intermediate power state according to an embodiment of the disclosure.

FIG. 8 is a diagram illustrating another example in which a storage device executes a target background operation in a first intermediate power state according to an embodiment of the disclosure.

Referring to FIG. 8, a controller 120 of a storage device 100 may check a background flag information BKOP_FLG in a first intermediate power state MPS_1 to determine that a target background operation BKOP_TGT is executable.

The controller 120 may execute the target background operation BKOP_TGT for less than a set threshold execution time THR_EXE_TIME. That is, the controller 120 may suspend the target background operation BKOP_TGT when the target background operation BKOP_TGT is not completed, after the threshold execution time THR_EXE_TIME elapses after starting the target background operation BKOP_TGT.

This is to prevent a delay in entering the second intermediate power state MPS_2 as a result of an increase in the time required for the controller 120 to execute the target background operation BKOP_TGT.

Hereinafter, embodiments in which the storage device 100 determines the background flag information BKOP_FLG will be described.

Figure 9:
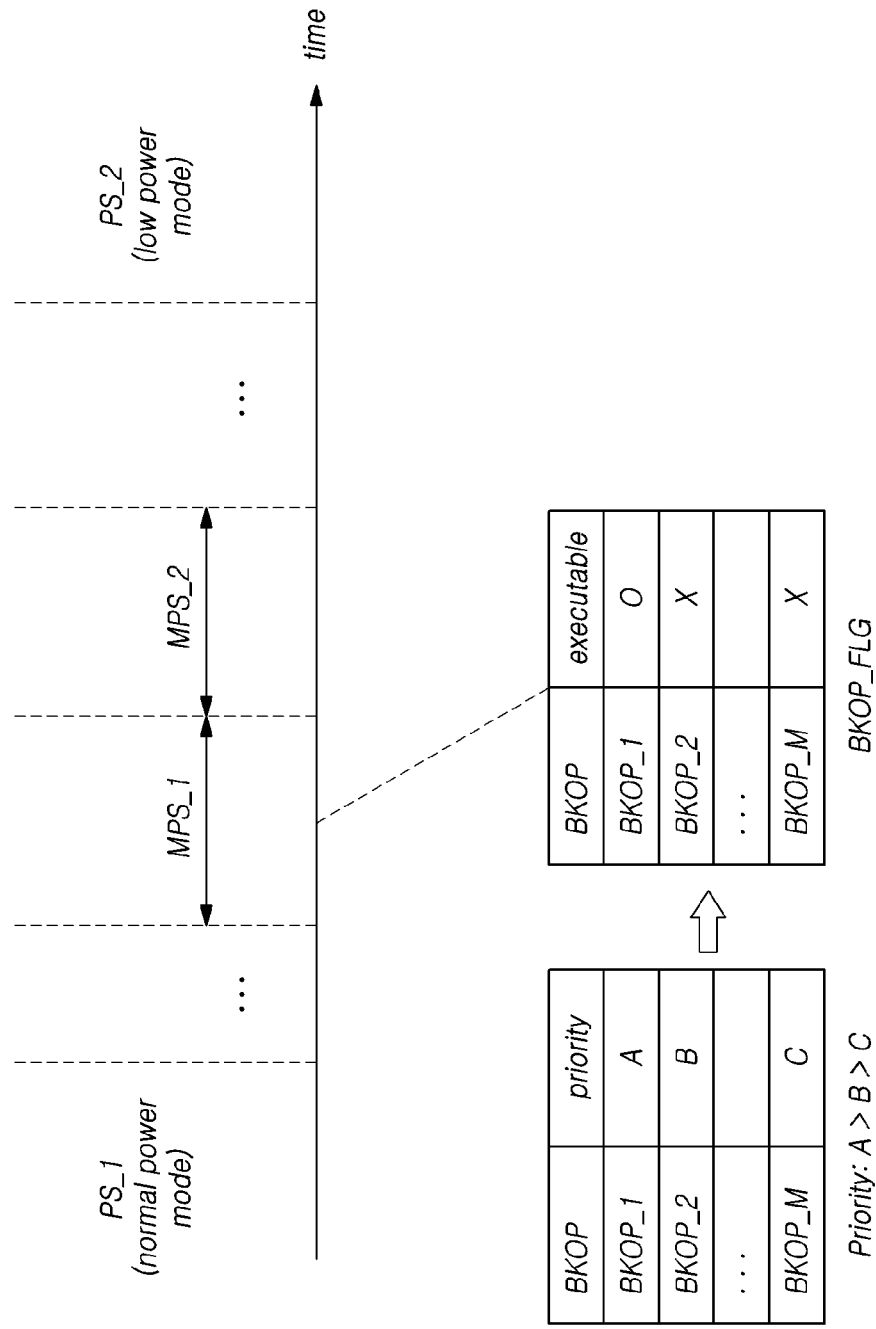
FIG. 9 is a diagram illustrating an example in which a storage device determines background flag information based on the priorities of background operations according to an embodiment of the disclosure.

FIG. 9 is a diagram illustrating an example in which a storage device determines background flag information based on the priorities of background operations according to an embodiment of the disclosure.

Referring to FIG. 9, a controller 120 of a storage device 100 may determine priorities of background operations BKOP. In FIG. 9, the priority of a background operation BKOP_1 is A, the priority of the background operation BKOP_2 is B, which is less than A, and the priority of a background operation BKOP_M is C, which is less than B.

The controller 120 may determine the background flag information BKOP_FLG so that a background operation having a higher priority, from among the background operations BKOP, is executed earlier.

In FIG. 9, the controller 120 may set only the background operation BKOP_1 to be executable, and set the background operation BKOP_2 and the background operation BKOP_M to be non-executable in the background flag information BKOP_FLG so that the background operation BKOP_1 is executed before the background operation BKOP_2 and the background operation BKOP_M.

Meanwhile, the priority of the background operations BKOP may be determined in various ways. For example, the priority of the background operations BKOP may be determined based on the type of the background operations BKOP. As another example, the priority of the background operations BKOP may be determined based on the size of data to be processed by the background operations BKOP.

Hereinafter, an embodiment in which the storage device 100 determines priorities of the background operations BKOP will be described in FIGS. 10 and 11.

Figure 10:
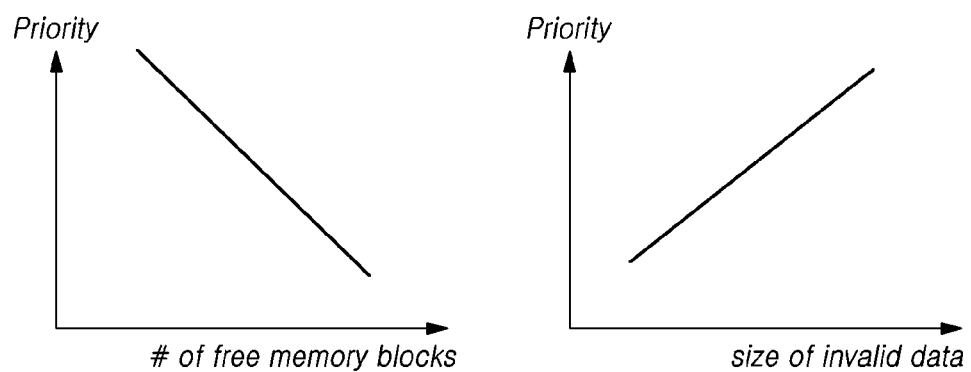
FIG. 10 is a diagram illustrating an example in which a storage device determines the priority of background operations according to an embodiment of the disclosure.

FIG. 10 is a diagram illustrating an example in which a storage device determines the priority of background operations according to an embodiment of the disclosure.

Referring to FIG. 10, a controller 120 of a storage device 110 may set the priority of a garbage collection GC operation to be inversely proportional to the number of free memory blocks included in a memory. This is because the need to generate new free memory blocks by performing garbage collection GC operations increases as the number of free memory blocks included in the memory 100 decreases.

Alternatively, the controller 120 may set the priority of the garbage collection GC operation to be proportional to the size of invalid data stored in the memory 110. This is because the need to secure space for storing new data by executing garbage collection GC operations increases because the larger the size of the invalid data stored in the memory 110, the smaller the space available for storing new data in the memory 110.

Figure 11:
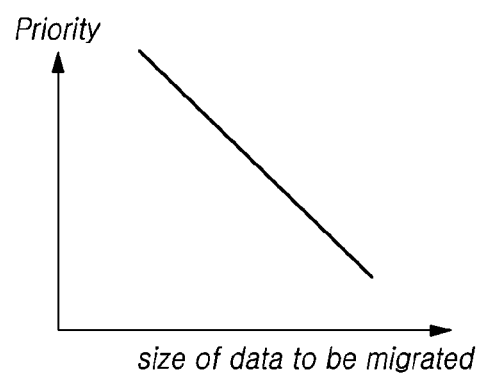
FIG. 11 is a diagram illustrating another example in which a storage device determines the priority of background operations according to an embodiment of the disclosure.

FIG. 11 is a diagram illustrating another example in which a storage device determines the priority of background operations according to an embodiment of the disclosure.

Referring to FIG. 11, a controller 120 of a storage device 100 may set the priority of an operation migrating data from a first type memory block to a second type memory block to be inversely proportional to the size of data to be migrated from the first type memory block to the second type memory block. This is because the smaller the size of data to be migrated, the faster the migration can be completed.

Figure 12:
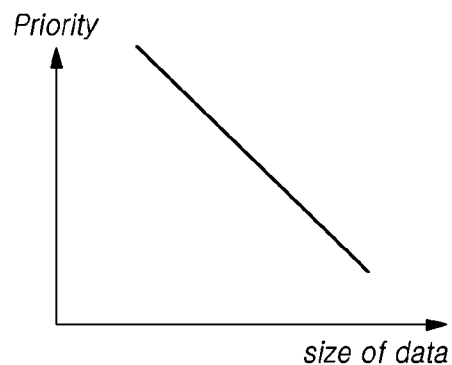
FIG. 12 is a diagram illustrating another example in which a storage device determines the priority of background operations according to an embodiment of the disclosure.

FIG. 12 is a diagram illustrating another example in which a storage device determines the priority of background operations according to an embodiment of the disclosure.

Referring to FIG. 12, a controller 120 of a storage device 110 may set the priority of an operation flushing the data stored in a buffer to a memory of storage device 110 to be inversely proportional to the size of the data stored in the buffer. This is because the smaller the size of the data stored in the buffer, the faster the flush operation can be completed.

In the above examples, operations occurring in the process the controller 120 operating the storage device 100 entering the second power state PS_2 from the first power state PS_1 have been described.

However, when a specific condition is satisfied before entering the second power state PS_2 from the first power state PS_1, the controller 120 of the storage device 100 may return to the first power state PS_1 without entering the second power state PS_2. Hereinafter, this will be described in FIG. 13.

Figure 13:
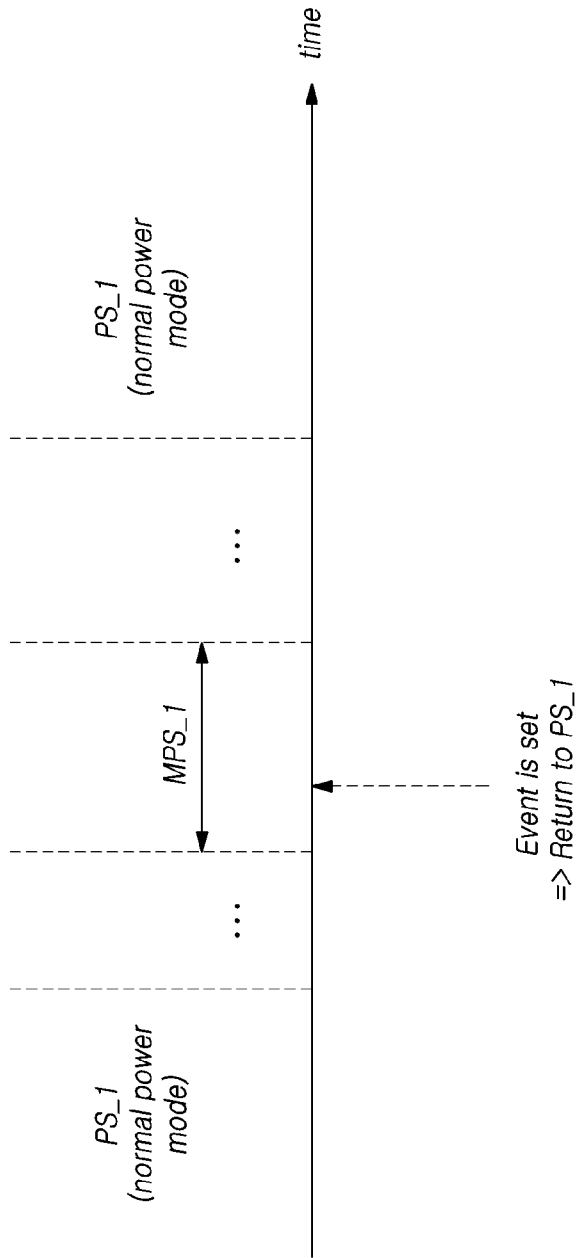
FIG. 13 is a diagram illustrating an example in which a storage device returns from a first intermediate power state to a first power state according to an embodiment of the disclosure.

FIG. 13 is a diagram illustrating an example in which a storage device returns from a first intermediate power state to a first power state according to an embodiment of the disclosure.

Referring to FIG. 13, a controller 120 of a storage device 100 may check, in addition to a background flag information BKOP_FLG described above, whether an event (e.g., H8 exit, reset) instructing to a return to a first power state PS_1 is set in a first intermediate power state MPS_1.

If it is confirmed that the event is set, then the controller 120 may return to the first power state PS_1 after the first intermediate power state MPS_1. At this time, before returning to the first power state PS_1, the controller 120 may re-enter intermediate power states, previously entered between the first power state PS_1 and the first intermediate power state MPS_1, in the reverse order.

Figure 14:
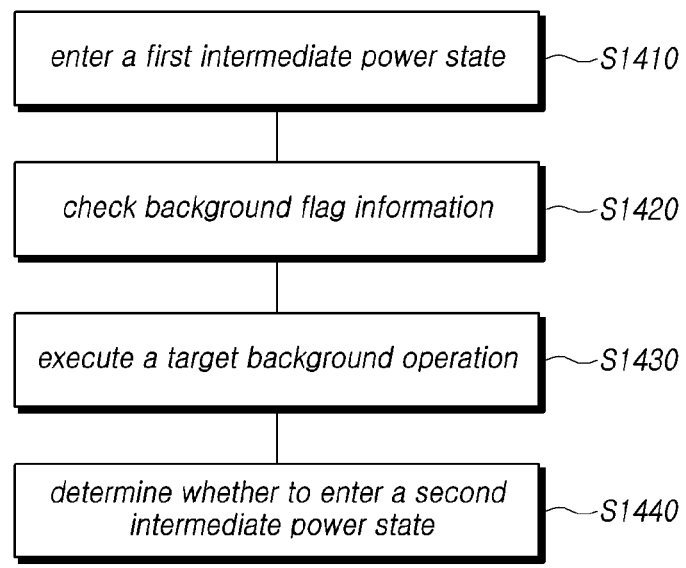
FIG. 14 is a diagram illustrating a method for operating a storage device according to an embodiment of the disclosure.

FIG. 14 is a diagram illustrating a method for operating a storage device according to an embodiment of the disclosure.

Referring to FIG. 14, a method for operating a storage device 100 may include entering a first intermediate power state MPS_1 among the plurality of intermediate power states MPS (S1410). In this case, the plurality of intermediate power states MPS are power states entered sequentially while transitioning from a first power state PS_1 to a second power state PS_2.

The method for operating the storage device 100 may include checking a background flag information BKOP_FLG indicating background operations that are executable from among the plurality of background operations BKOP (S1420).

For example, the background operations BKOP may include at least one of a garbage collection on the plurality of memory blocks BLK; flushing data stored in a buffer to the memory 110; migrating data stored in a first type memory block, among the plurality of memory blocks BLK, to a second type memory block having a larger storage capacity than the first type memory block; and erasing one or more of the plurality of memory blocks BLK.

The background flag information BKOP_FLG may be determined so that a background operation having a higher priority among the background operations BKOP is executed earlier.

For example, the priority of the garbage collection operation may be set to be inversely proportional to the number of free memory blocks included in the memory 110 or proportional to the size of invalid data stored in the memory 110.

For example, the priority of the operation migrating data from the first type memory block to the second type memory block may be set to be inversely proportional to the size of the data to be migrated from the first type memory block to the second type memory block.

For example, the priority of the operation flushing the data stored in the buffer to the memory may be set to be inversely proportional to the size of the data stored in the buffer. The method for operating the storage device 100 may include executing a target background operation BKOP_TGT executable in the first intermediate power state MPS_1 based on the background flag information BKOP_FLG (S1430).

The method for operating the storage device 100 may include determining whether to enter a second intermediate power state MPS_2 among the plurality of intermediate power states MPS (S1440).

The method for operating the storage device 100 may further include periodically decreasing the operating clock CLK and the operating voltage VOL when transitioning to the second intermediate power state MPS_2 from the first intermediate power state MPS_1.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory including a plurality of memory blocks; and
   a controller configured to:
   during changing a power state of the controller from a first power state to a second power state, change the power state of the controller through a plurality of intermediate power states between the first power state and the second power state, determine background operations executable in each of the plurality of intermediate power states when the power state of the controller changes to each of the plurality of intermediate power states, and execute a target background operation, among the executable background operations executable in a first intermediate power when the power state of the controller changes to the first intermediate power state, wherein the controller is configured to determine the target background operation to execute a background operation having a higher priority earlier, wherein the controller is configured to execute the target background operation for less than a set threshold execution time, and wherein the controller is configured to suspend the target background operation when the target background operation is not completed after the threshold execution time elapses after starting the target background operation.

2. The storage device according to claim 1,
wherein the controller is configured to decrease an operating clock and an operating voltage when changing a second intermediate power state from the first intermediate power state.

3. The storage device according to claim 1,
wherein the background operations include at least one of a garbage collection on the plurality of memory blocks; flushing data stored in a buffer to the memory; migrating data stored in a first type memory block, among the plurality of memory blocks, to a second type memory block having a larger storage capacity than the first type memory block; and erasing one or more of the plurality of memory blocks.

4. The storage device according to claim 1,
wherein the controller is configured to execute the target background operation executable in a first intermediate power state before entering a second intermediate power state.

5. The storage device according to claim 1,
wherein the controller is configured to set the priority of the garbage collection operation to be inversely proportional to the number of free memory blocks included in the memory or to be proportional to the size of invalid data stored in the memory.

6. The storage device according to claim 1,
wherein the controller is configured to set the priority of the operation migrating data from the first type memory block to the second type memory block to be inversely proportional to the size of the data to be migrated from the first type memory block to the second type memory block.

7. The storage device according to claim 1,
wherein the controller is configured to set the priority of the operation flushing the data stored in the buffer to the memory to be inversely proportional to the size of the data stored in the buffer.

8. The storage device according to claim 1,
wherein the controller is further configured to check whether an event instructing to return to the first power state is set in the first intermediate power state.

9. The storage device according to claim 1,
wherein the controller is configured to determine the background operations executable in each of the plurality of intermediate power states by background flag information.

10. A method for operating a storage device, comprising:
during changing a power state from a first power state to a second power state, change the power state through a first intermediate power state among a plurality of intermediate power states between the first power state and the second power state;

determining background operations executable in each of the plurality of intermediate power states when the power state changes to each of the plurality of intermediate power states; and executing a target background operation among the executable background operations executable in a first intermediate power state, when the power state of the controller changes to the first intermediate power state, wherein the executing the target background operation determines the target background operation to execute a background operation having a higher priority earlier, wherein the executing the target background operation executes the target background operation for less than a set threshold execution time, and wherein the executing the target background operation executes suspends the target background operation when the target background operation is not completed after the threshold execution time elapses after starting the target background operation.

11. The method according to claim 10, further comprising:
decreasing an operating clock and an operating voltage when changing a second intermediate power state from the first intermediate power state.

12. The method according to claim 10,
wherein the background operations include at least one of a garbage collection on the plurality of memory blocks; flushing data stored in a buffer to the memory; migrating data stored in a first type memory block among the plurality of memory blocks to a second type memory block having a larger storage capacity than the first type memory block; and erasing one or more of the plurality of memory blocks.

13. The method according to claim 10,
wherein the executing the target background operation executes the target background operation executable in a first intermediate power state before entering a second intermediate power state.

14. The method according to claim 10,
wherein the priority of the garbage collection operation is set to be inversely proportional to the number of free memory blocks included in the memory or to be proportional to the size of invalid data stored in the memory.

15. The method according to claim 10,
wherein the priority of the operation migrating data from the first type memory block to the second type memory block is set to be inversely proportional to the size of the data to be migrated from the first type memory block to the second type memory block.

16. The method according to claim 10,
wherein the priority of the operation flushing the data stored in the buffer to the memory is set to be inversely proportional to the size of the data stored in the buffer.

17. The method according to claim 10,
wherein the determining background operations determines the background operations executable in each of the plurality of intermediate power states by background flag information.

18. A controller comprising:
a memory interface capable of communicating with a memory including a plurality of memory blocks; and
a control circuit configured to:
during changing a power state of the controller from a first power state to a second power state, change the power state of the controller through a plurality of intermediate power states between a normal state consuming a first power and a low power state consuming a second power, which is less than the first power, and
execute, while entering each of the plurality of intermediate power states, an executable background operation from among a plurality of background operations,
wherein the control circuit is configured to determine target background operation to execute a background operation having a higher priority earlier,
wherein the control circuit is configured to execute the executable background operation for less than a set threshold execution time, and
wherein the control circuit is configured to suspend the executable background operation when the executable background operation is not completed after the threshold execution time elapses after starting the executable background operation.

* * * * *